US012617426B2

(12) United States Patent
Kundu et al.

(10) Patent No.: US 12,617,426 B2
(45) Date of Patent: May 5, 2026

(54) AUTONOMOUS DOCKING SYSTEM FOR FREIGHT TRUCKS

(71) Applicant: HITACHI, Ltd., Tokyo (JP)

(72) Inventors: Subrata Kumar Kundu, Canton, MI (US); Haruki Matono, Novi, MI (US); Xiaoliang Zhu, Northville, MI (US); Akshay Gokhale, Northville, MI (US)

(73) Assignee: HITACHI, LTD., Tokyo (JP)

( * ) Notice: Subject to any disclaimer, the term of this patent is extended or adjusted under 35 U.S.C. 154(b) by 198 days.

(21) Appl. No.: 18/603,162

(22) Filed: Mar. 12, 2024

(65) Prior Publication Data

US 2025/0289466 A1     Sep. 18, 2025

(51) Int. Cl.
| | |
|---|---|
| *G06V 10/80* | (2022.01) |
| *B60W 50/14* | (2020.01) |
| *B60W 60/00* | (2020.01) |
| *G06T 7/50* | (2017.01) |
(Continued)

(52) U.S. Cl.
CPC .......... B60W 60/001 (2020.02); B60W 50/14 (2013.01); G06T 7/50 (2017.01); G06V 10/80 (2022.01); G06V 20/52 (2022.01); G06V 20/56 (2022.01); B60W 2300/12 (2013.01); B60W 2420/403 (2013.01);
(Continued)

(58) Field of Classification Search
CPC .............. B60W 60/001; B60W 50/14; B60W 2300/12; B60W 2420/403; G06T 7/50; G06T 2207/10028; G06T 2207/30252; G06V 2201/08; G06V 10/80; G06V 20/52; G06V 20/56
See application file for complete search history.

(56) References Cited

U.S. PATENT DOCUMENTS

| | | |
|---|---|---|
| 6,677,889 B2 | 1/2004 | Van Rees et al. |
| 10,214,350 B2 | 2/2019 | Liu et al. |
| 2016/0275667 A1* | 9/2016 | Modica .................. G01S 17/06 |
(Continued)

FOREIGN PATENT DOCUMENTS

| | | |
|---|---|---|
| CN | 105517664 A | 4/2016 |
| WO | 2017091066 A1 | 6/2017 |

OTHER PUBLICATIONS

Du et al., "Curvefusion—A Method for Combining Estimated Trajectories with Applications to SLAM and Time-Calibration," Sensors, 2020, 20, 6918, 25 pages.
(Continued)

*Primary Examiner* — Russell Frejd
*Assistant Examiner* — Chanmin Park
(74) *Attorney, Agent, or Firm* — PROCOPIO, CORY, HARGREAVES & SAVITCH LLP

(57) ABSTRACT

Autonomous docking systems and methods receive asynchronous images from a vehicle-mounted camera and a plurality of infrastructure cameras and perform object mapping to determine candidate routes leading to a docking station. Candidate routes are divided into route segments for which disparity map quality scores are estimated to select a navigation route. Information from infrastructure cameras and vehicle-mounted cameras is used to generate a disparity map to perform object detection, distance measurement, or localization along the navigation route. The disparity map is used to communicate navigation commands to an HMI or a vehicle control system.

19 Claims, 10 Drawing Sheets

(51) Int. Cl.
  *G06V 20/52*        (2022.01)
  *G06V 20/56*        (2022.01)
(52) U.S. Cl.
  CPC .............. *G06T 2207/10028* (2013.01); *G06T 2207/30252* (2013.01); *G06V 2201/08* (2022.01)

(56) References Cited

U.S. PATENT DOCUMENTS

| | | | |
|---|---|---|---|
| 2018/0346029 A1* | 12/2018 | Kabos | B62D 15/029 |
| 2022/0292289 A1* | 9/2022 | Shalumov | G06T 3/4038 |
| 2025/0203230 A1* | 6/2025 | Brändli | G01S 17/42 |

OTHER PUBLICATIONS

Rublee et al., "ORB: An efficient alternative to SIFT or SURF," ICCV 2011: pp. 2564-2571.
Mur-Artal et al., "ORB-SLAM: A Versatile and Accurate Monocular SLAM System," IEEE Transactions on Robotics, vol. 31, No. 5, pp. 1147-1163, Oct. 2015, doi: 10.1109/TRO.2015.2463671.

* cited by examiner

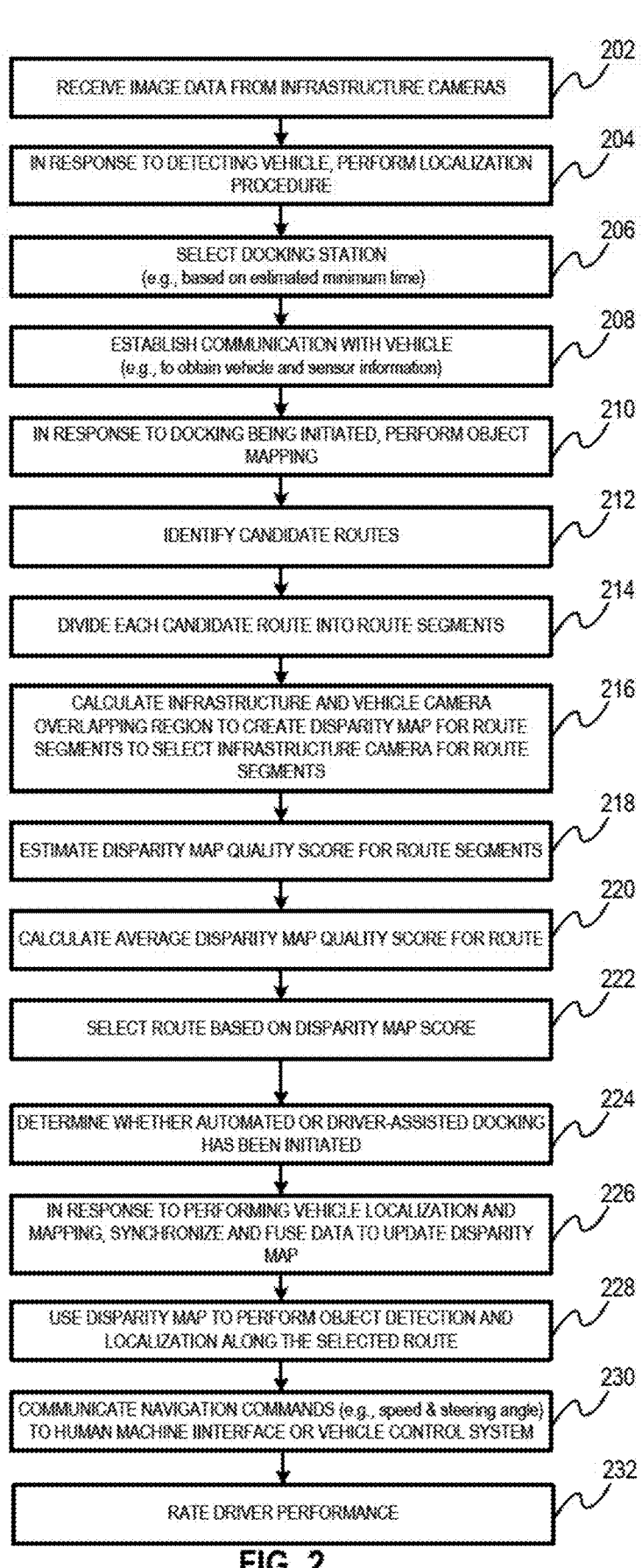

202 — RECEIVE IMAGE DATA FROM INFRASTRUCTURE CAMERAS

204 — IN RESPONSE TO DETECTING VEHICLE, PERFORM LOCALIZATION PROCEDURE

206 — SELECT DOCKING STATION (e.g., based on estimated minimum time)

208 — ESTABLISH COMMUNICATION WITH VEHICLE (e.g., to obtain vehicle and sensor information)

210 — IN RESPONSE TO DOCKING BEING INITIATED, PERFORM OBJECT MAPPING

212 — IDENTIFY CANDIDATE ROUTES

214 — DIVIDE EACH CANDIDATE ROUTE INTO ROUTE SEGMENTS

216 — CALCULATE INFRASTRUCTURE AND VEHICLE CAMERA OVERLAPPING REGION TO CREATE DISPARITY MAP FOR ROUTE SEGMENTS TO SELECT INFRASTRUCTURE CAMERA FOR ROUTE SEGMENTS

218 — ESTIMATE DISPARITY MAP QUALITY SCORE FOR ROUTE SEGMENTS

220 — CALCULATE AVERAGE DISPARITY MAP QUALITY SCORE FOR ROUTE

222 — SELECT ROUTE BASED ON DISPARITY MAP SCORE

224 — DETERMINE WHETHER AUTOMATED OR DRIVER-ASSISTED DOCKING HAS BEEN INITIATED

226 — IN RESPONSE TO PERFORMING VEHICLE LOCALIZATION AND MAPPING, SYNCHRONIZE AND FUSE DATA TO UPDATE DISPARITY MAP

228 — USE DISPARITY MAP TO PERFORM OBJECT DETECTION AND LOCALIZATION ALONG THE SELECTED ROUTE

230 — COMMUNICATE NAVIGATION COMMANDS (e.g., speed & steering angle) TO HUMAN MACHINE IINTERFACE OR VEHICLE CONTROL SYSTEM

232 — RATE DRIVER PERFORMANCE

FIG. 2

Stereo image rectification

Sample images captured by vehicle and infrastructure cameras

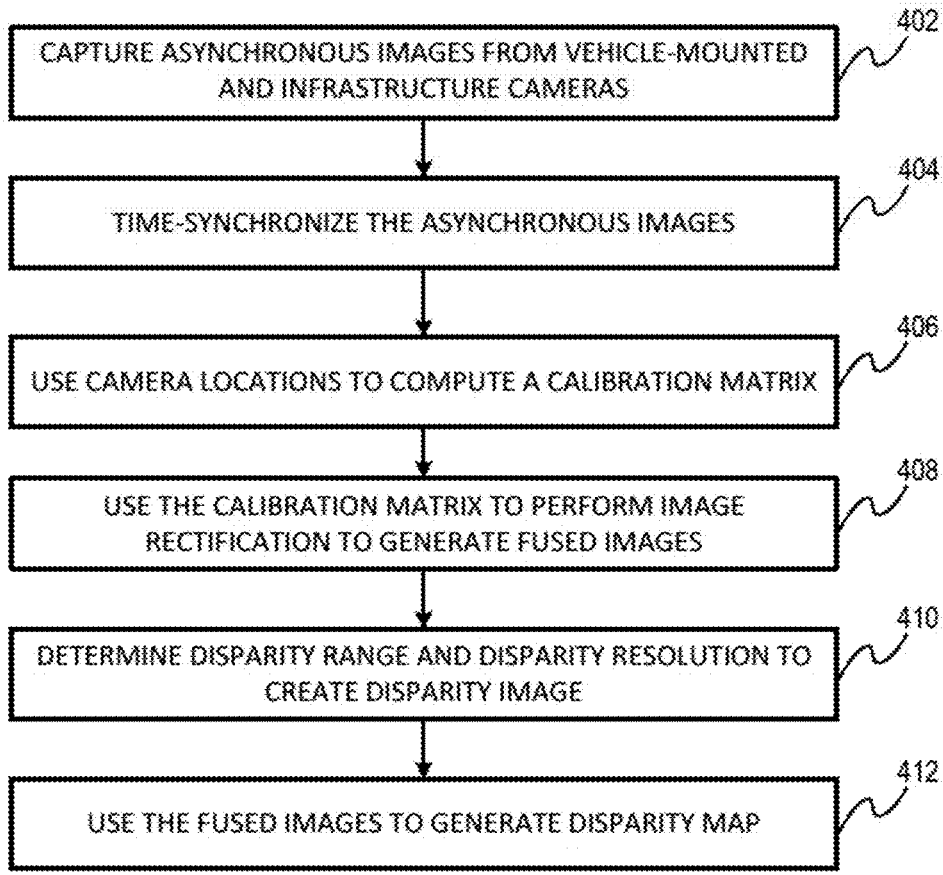

CAPTURE ASYNCHRONOUS IMAGES FROM VEHICLE-MOUNTED AND INFRASTRUCTURE CAMERAS 402

TIME-SYNCHRONIZE THE ASYNCHRONOUS IMAGES 404

USE CAMERA LOCATIONS TO COMPUTE A CALIBRATION MATRIX 406

USE THE CALIBRATION MATRIX TO PERFORM IMAGE RECTIFICATION TO GENERATE FUSED IMAGES 408

DETERMINE DISPARITY RANGE AND DISPARITY RESOLUTION TO CREATE DISPARITY IMAGE 410

USE THE FUSED IMAGES TO GENERATE DISPARITY MAP 412

FIG. 4

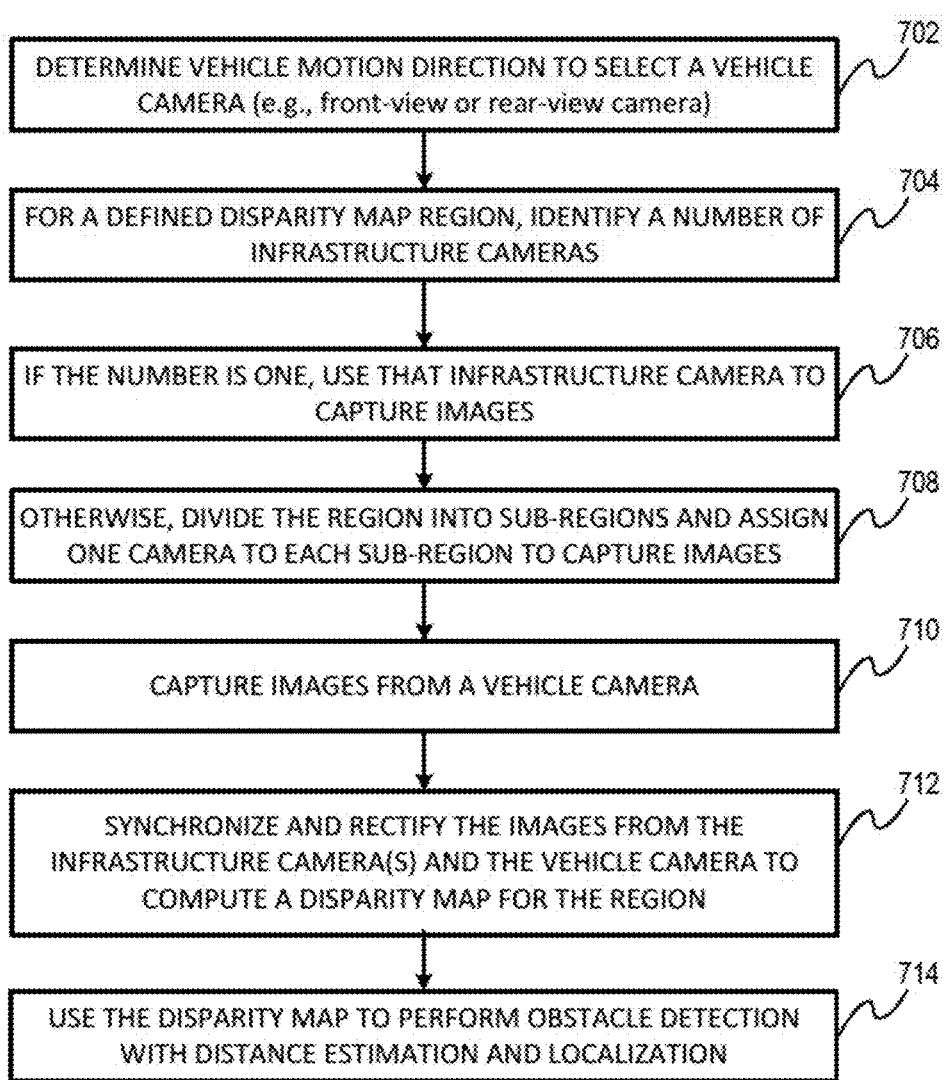

DETERMINE VEHICLE MOTION DIRECTION TO SELECT A VEHICLE CAMERA (e.g., front-view or rear-view camera) 702

FOR A DEFINED DISPARITY MAP REGION, IDENTIFY A NUMBER OF INFRASTRUCTURE CAMERAS 704

IF THE NUMBER IS ONE, USE THAT INFRASTRUCTURE CAMERA TO CAPTURE IMAGES 706

OTHERWISE, DIVIDE THE REGION INTO SUB-REGIONS AND ASSIGN ONE CAMERA TO EACH SUB-REGION TO CAPTURE IMAGES 708

CAPTURE IMAGES FROM A VEHICLE CAMERA 710

SYNCHRONIZE AND RECTIFY THE IMAGES FROM THE INFRASTRUCTURE CAMERA(S) AND THE VEHICLE CAMERA TO COMPUTE A DISPARITY MAP FOR THE REGION 712

USE THE DISPARITY MAP TO PERFORM OBSTACLE DETECTION WITH DISTANCE ESTIMATION AND LOCALIZATION 714

FIG. 7

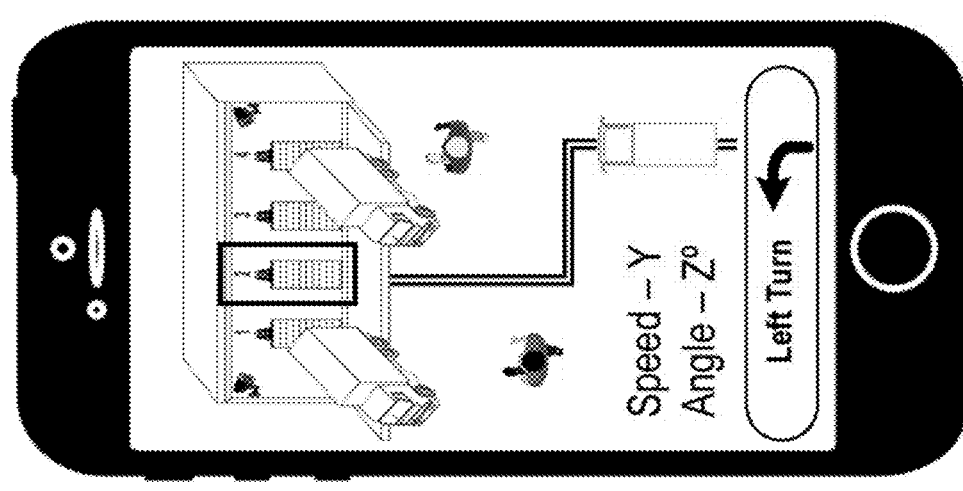
FIG. 9C
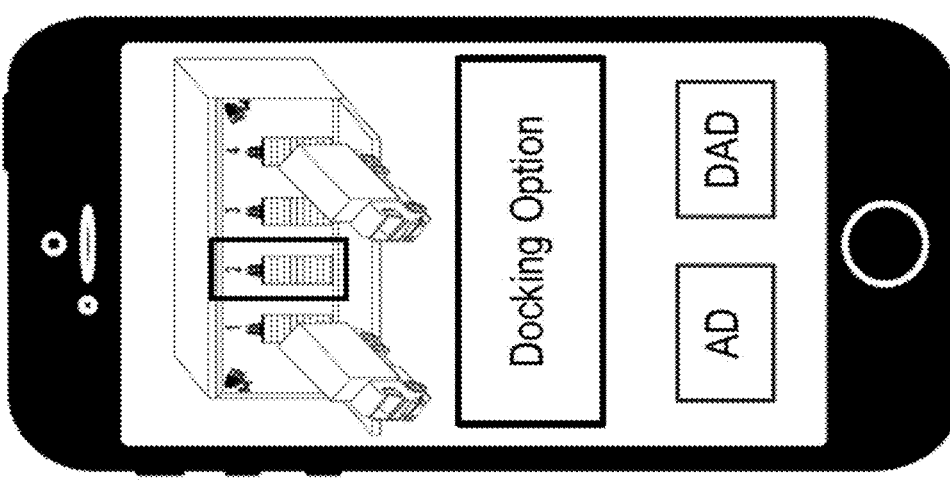
FIG. 9B
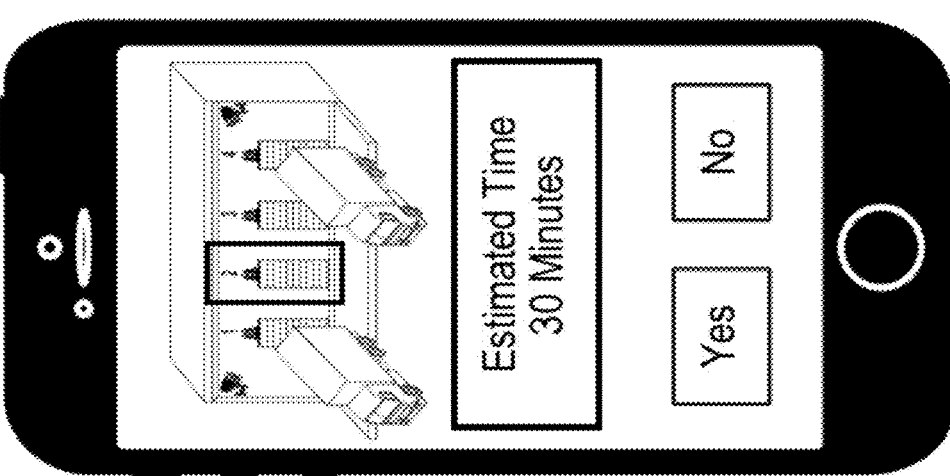
FIG. 9A

AUTONOMOUS DOCKING SYSTEM FOR FREIGHT TRUCKS

BACKGROUND

Field

The present disclosure is generally directed to autonomous driving, and more specifically, to systems and methods for autonomous docking of vehicles, such as freight trucks, at a docking facility, e.g., a warehouse.

Related Art

Connected automated trucks are gaining wide attention as recent rapid technological advancements in digitalization, artificial intelligence, robotics, and advanced computing platforms are expected to play major role in the future of connected mobility ecosystem, which is instrumental in fostering a sustainable and resilient society. Ensuring the safe and reliable operation of freight trucks is critically important for achieving the ultimate benefits for the logistics industry. However, efficient and safe autonomous docking of logistics trucks still remains a challenge. In addition, the logistics industry suffers from truck driver shortages, lack of adequate parking facilities, driver fatigue issues, and protracted waiting periods at loading or docking stations. These factors exacerbate delivery delays, increase backlogs, and add to supply chain costs. Docking a long truck proficiently at a docking station, which is critical not only to avoid delays or detention at docking facilities but also to increase the logistical efficiency, creates a challenge especially for inexperienced truck drivers.

Existing methods for intelligent docking, which involve remote monitoring and autonomous vehicles guidance based on image or video data, typically ascertain a vehicle's present location and maneuver the vehicle using cameras. However, these methods oftentimes result in inaccuracies. Some truck docking techniques offer assistance once when trailer approaches a docking station, utilizing radar, camera, ultrasonic sensors, etc., at the docking bay to gauge the distance between the trailer and edge of the docking station, providing relevant guidance. However, during peak times in large warehouses or facilities, it becomes challenging for novice truck drivers to navigate from the entrance gate to the docking station and securely dock the trailer at the docking station within a limited time frame. Conventional autonomous docking of the truck at the docking station relies on vehicle-mounted front and back cameras, which fall short in achieving precise distance and localization estimation.

SUMMARY

In embodiments described herein, end-to-end automated docking systems and methods provide driving assistance or fully autonomously docking for trucks at a docking station. This is accomplished through the implementation of data fusion techniques that combine asynchronous information from both infrastructure cameras located at a docking facility and truck-mounted cameras. This integration significantly increases the accuracy of 3D depth mapping at docking facilities. The resulting improvements in object detection and localization increase perception and distance measurement accuracy, thereby facilitating the efficient operation of automated docking systems. Additional advantages include systems and methods for using feedback to assess driver performance and targeted generate recommendations for driver training.

In some aspects of the disclosure, a docking system identifies an available docking station based on image data from infrastructure cameras and vehicle-related information. The docking system extracts features from the image data to perform an object mapping to identify objects in proximity to the docking facility to determine candidate routes leading to the available docking station. For each of the candidate routes, the docking system iteratively divides the candidate route into waypoints and determines route segments defined by a distance between two waypoints. For each route segment location information regarding the infrastructure cameras or vehicle-mounted cameras are used to determine an overlapping region between a vehicle-mounted camera and an infrastructure camera to select an infrastructure camera whose images are then combined with those from the vehicle-mounted camera to create a three-dimensional (3-D) depth map. This map is used to estimate a disparity map quality score for each route segment to estimate a disparity map quality score for the candidate routes. Estimating the disparity map quality scores may comprise simulating overlapping regions between the vehicle-mounted camera and an infrastructure camera among the plurality of infrastructure cameras. Once a candidate route is selected for navigation a disparity map is generated to perform object detection, distance measurement, and localization along the navigation route. Navigation commands are securely communicated to a human machine interface (HMI), e.g., a smartphone, or a vehicle control system.

Aspects of the present disclosure can involve a system, which can involve means for performing steps comprising: in response to receiving asynchronous images from a vehicle-mounted camera and a plurality of infrastructure cameras, performing an object mapping to determine candidate routes leading to a docking station; in response to dividing each candidate route into route segments, estimating for each route segment a disparity map quality score to select a navigation route among the candidate routes; using information from at least some of the plurality of infrastructure cameras and the vehicle-mounted camera to generate a disparity map to perform at least one of object detection, distance measurement, or localization along the navigation route; and using the disparity map to communicate navigation commands to at least one of a HMI or a vehicle control system.

Aspects of the present disclosure can involve a non-transitory computer-readable medium for storing instructions for executing a process. The instructions can involve: in response to receiving asynchronous images from a vehicle-mounted camera and a plurality of infrastructure cameras, performing an object mapping to determine candidate routes leading to a docking station; in response to dividing each candidate route into route segments, estimating for each route segment a disparity map quality score to select a navigation route among the candidate routes; using information from at least some of the plurality of infrastructure cameras and the vehicle-mounted camera to generate a disparity map to perform at least one of object detection, distance measurement, or localization along the navigation route; and using the disparity map to communicate navigation commands to at least one of an HMI or a vehicle control system.

Aspects of the present disclosure can involve a method for autonomous docking system, which can involve: in response to receiving, at a docking system from a plurality of infrastructure cameras that are mounted at different locations and orientations at a docking facility, image data indicative of a presence of a vehicle, obtaining vehicle-related information from a vehicle, which comprises a vehicle-mounted camera, to identify an available docking station. Features extracted from at least some of the image data can be used to perform an object mapping to identify one or more objects in proximity to the docking facility. The object mapping can be used to determine candidate routes leading to the available docking station. For each of the candidate routes, iteratively steps can be performed comprising: dividing the candidate route into a plurality of waypoints; determining route segments that each is defined by a distance between two waypoints among the plurality of waypoints; for each of one or more route segments among the route segments, performing steps comprising: using location information regarding at least some of the plurality of infrastructure cameras and the vehicle-mounted camera to determine an overlapping region between the vehicle-mounted camera and one infrastructure camera among the plurality of infrastructure cameras to identify a selected infrastructure camera; combining asynchronous images from the selected infrastructure camera and from the vehicle-mounted camera, to create a three-dimensional (3-D) depth map; and using the 3-D depth maps to estimate a disparity map quality score; and using the disparity map quality scores for the route segments to estimate a disparity map quality score for the candidate route. The disparity map quality scores can be used for the candidate routes to select a navigation route, and information from at least some of the plurality of infrastructure cameras and the vehicle-mounted camera can be used to generate a disparity map to perform object detection, distance measurement, and localization along the navigation route. Finally, the disparity map can be used to communicate navigation commands to at least one of an HMI or a vehicle control system.

BRIEF DESCRIPTION OF DRAWINGS

FIG. 2 is a flowchart illustrating an autonomous docking process, in accordance with an example implementation.

FIG. 4 is a flowchart illustrating a process for creating a disparity map using two different cameras, in accordance with an example implementation.

FIG. 7 is a flowchart illustrating a camera selection process for computing the disparity using asynchronous cameras, in accordance with an example implementation.

FIGS. 9A to 9C depict examples of messages sent by an autonomous docking system to a driver for display on a human machine interface (HMI), in accordance with an example implementation.

DETAILED DESCRIPTION

Figure 1:
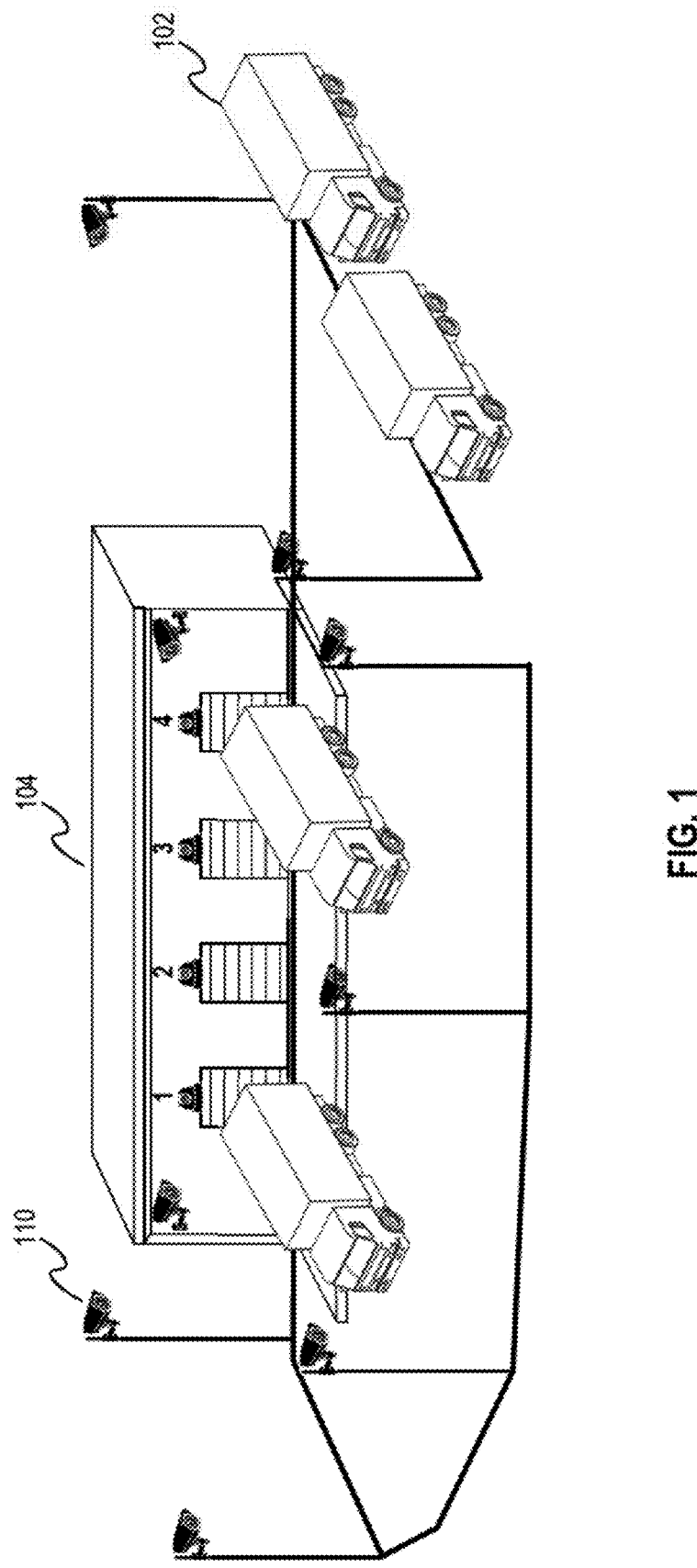
FIG. 1 illustrates a simplified system for autonomous docking of freight trucks at a warehouse docking station, in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

FIG. 1 illustrates a simplified system designed for autonomous docking of freight trucks at a warehouse docking station, in accordance with an example implementation. Freight trucks (e.g., 102) are used for loading and unloading goods at warehouse facility 104. Docking stations (e.g., 106) are integral to logistics warehouses where truck 102 aligns its trailers for transferring the goods. As depicted in FIG. 1, facility 104 is equipped with an array of cameras (hereinafter referred to as "infrastructure cameras") (e.g., 110) and can accommodate any number of docking stations for simultaneous usage by several trucks, thereby enabling faster and efficient supply chain operations.

For large conventional warehouses, it is common for multiple trucks to queue for the loading and unloading of goods. Therefore, the effective management of trucks to streamline these processes is critical for optimizing warehouse operations and, ultimately, the overall efficiency of the supply chain. While experienced truck drivers may find it relatively easy to maneuver a long trailer truck from the entrance gate of warehouse facility 104 to the docking station, this docking operation poses a significant challenge for novice drivers, especially given the time constraints and the often necessary reverse movements of the truck within confined spaces.

Commonly available autonomous docking solutions for warehouse facilities primarily leverage available sensors of automated trucks for path planning, obstacle detection, etc., and continuous control of the truck's movements. The docking station is typically fitted with various sensors including cameras, lidar, ultrasonic sensors, and radar. These sensors are used to measure the distance between trailers and docking stations to provide assistance to the driver. However, single-source sensors, e.g., single camera information for obstacle detection and distance measurement, which is widely used in trucks and infrastructure cameras, tend to fail to recognize obstacles and provide only coarse distance information. While existing stereo-vision techniques employing at least two cameras offer a solution, they are comparatively costly. Thus, ensuring the reliability and safety using standalone sensor systems for autonomous docking of trucks at a docking station remains a challenging task. Therefore, it would be desirable to have systems and methods that overcome these limitations.

Therefore, in embodiments herein, different sources of cameras are used to create a depth map of a truck's surrounding environment to achieve enhanced accuracy in obstacle detection, distance estimation, and localization to improve automated driving. As discussed in greater detail below, an optimal combination of infrastructure cameras and truck cameras is selected from a range of available cameras to generate the depth map. Such a camera selection process may be performed for each segment of a truck's route to ensure the most effective camera utilization.

FIG. 2 is a flowchart illustrating an autonomous docking process, in accordance with an example implementation. In embodiments, autonomous docking process may start at step 202 when image data from one or more infrastructure cameras is received at a docking system. The docking system may continuously monitor incoming or parked trucks and utilize warehouse facility infrastructure cameras such as those shown in FIG. 1.

At step 204, in response to detecting the presence of the vehicle, a localization is performed to localize the vehicle. For example, once the docking system detects a truck at the docking station entrance gate or behind an existing waiting truck, the system determines the vehicle information and location of the vehicle.

At step 206, a docking station is determined or selected (e.g., based on a minimum time required for docking that may be estimated from factors such as number of waiting vehicles waiting for docking, number of available docking stations, etc.). Further, a total time required for the vehicle to dock at a docking station can be calculated.

At step 208, communication with the vehicle is established, e.g., a secure communication between the docking system and the vehicle control system to exchange vehicle information, sensor specification, estimated minimum time required for docking, etc. It is understood that any communication technology including conventional cellular networks (Long Term Evolution (LTE), 5G), Wi-Fi, dedicated short range communication (DSRC), cellular vehicle to everything (C V2X), etc., can be used for establishing communication between the docking system and the vehicle. A human machine interface (HMI) which can be drivers' cellular phone of dashboard of truck can be used to send the estimated minimum time required to commence a docking operation to the driver, e.g., in the form of visual message and/or audible message, as illustrated in FIG. 9A.

At step 210, in response to a docking procedure having been initiated, an object mapping is performed, e.g., to identify one or more obstacles. The system may determine objects (trucks, obstacles, etc.) in the operational design domain of the warehouse to create an object map. This object map helps to identify obstacles on the routes for the truck to move from the entrance gate to the docking station. It is noted that in scenarios where a driver does not want to dock the truck at the warehouse facility, the system may continue its operation for the next truck in line.

At step 212, candidate routes (e.g., available routes for the truck from the entrance gate to the selected docking gate) are identified from a number of possible routes.

At step 214, each candidate route is divided into a plurality of route segments that are defined by the distance between two waypoints, and a stopping site distance may be calculated for each road segment. Stopping sight distance can be defined as the distance needed for a driver to see an object on the roadway and bring the vehicle to a complete stop before the object. Stopping sight distance depends on the speed limit of the road and for this case, the system administrator can define the stopping sight distance for different road segments considering the factors including safety and road geometry. It is noted that the length of road segments can vary (e.g., from a few centimeters to several meters).

At step 216, an infrastructure camera for use with a vehicle-mounted camera is selected to create the disparity map or 3D depth map for each of the road segments of the candidate routes, for example, in response to calculating overlapping regions between the vehicle-mounted camera and one of the infrastructure cameras. The selection process is discussed further below with reference to FIG. 7.

The system stores information about which infrastructure cameras are to be used with the vehicle-mounted camera for the selected road segments to create the disparity map. Creating disparity maps or 3-D depth maps using the combination of infrastructure camera and vehicle cameras in this manner aids in detecting obstacles and perform vehicle localization with high accuracy using the disparity map. A disparity map for each road segment is created at least for their stopping sight distance. Since the system already knows vehicle camera specification (location on the vehicle, resolution, field of view, etc.), it can determine the infrastructure camera needed for the road segment to create the disparity map.

At step 218, a disparity map quality score is estimated for the route segments.

At step 220, an average disparity map quality score is calculated for the route segments. For every road segment, two images from the vehicle camera and infrastructure camera are used to create the disparity map. Note that, in some instances, the stopping sight distance of a vehicle might be covered by two cameras. In such a situation, a disparity map can be divided into two regions, such as close to the vehicle region and far from the vehicle region. Regarding the close to the vehicle region, the system will utilize images from the vehicle camera and the infrastructure camera which are close to the vehicle. To create the disparity for the far region, images from the vehicle camera and the infrastructure camera which are far to the vehicle are used. Details of the calculation procedure are mentioned in greater detail below. As previously mentioned, for each potential route, the system selects the infrastructure camera to be used for each road segment to create the disparity map and estimate the quality of disparity map, which is created by using information from the vehicle camera and infrastructure cameras. A disparity map quality score is estimated for each of the potential routes.

At step 222, a route is selected (e.g., a route that provides a maximum estimated quality of a disparity map). It is noted that, in case of a single route being available for the truck to reach its docking station, the system determines the infrastructure camera needed for each road segment to create the disparity map.

At step 224, it is determined whether automated or driver-assisted docking has been initiated. The system sends the selected route to the driver and provides the driver with options for docking. A recommended route and options are displayed to the driver HMI, e.g., together with voice assistance features. Out of two options (1) Automated Docking (AD) and (2) Driver Assistance Docking (DAD), drivers can select an option for docking the truck to the docking station. Options and routing information are provided to drivers once the system determines the time when a truck is ready for docking. In scenarios where vehicle specifications indicate that remote-controlled driving is feasible for a particular truck, and the driver selects the automated driving option, the system sends the driving route to the vehicle's HMI. Further, steering and speed commands are sent to the vehicle network to be processed by the vehicle's electronic control unit (ECU) for remote autonomous driving. Although a vehicle is equipped with remote control functionality, a driver can select Driver Assistance Support. Similarly, the system may override a driver's remote control selection in favor of the Driver Assistance Docking option. Once the driver selects the Driver Assistance Docking option, the system displays the recommended driving route on the vehicle's HMI, e.g., together with recommended speed and steering angles.

At step 226, in response to performing vehicle localization, synchronized and fused data of infrastructure and vehicle camera data, e.g., for one or more sampling times that may vary from one millisecond to several milliseconds, is used to update the disparity map for the route, e.g., in real-time.

For example, for every segment of the route, the system first creates the disparity map after synchronization and fusion of selected infrastructure and vehicle cameras as discussed further below with reference to FIG. 4. The system will continue monitoring obstacle detection and localization on the driving route using disparity map of the related route. Update of route and vehicle information as well as recommended speed and steering angle can be communicated to the vehicle's HMI at each sampling interval or at intermittent sampling intervals, e.g., based on system administrator settings.

At step 228, the disparity map is used to perform object detection and localization along the selected route.

At step 230, the docking system communicates navigation commands, such as speed and steering angle, to either the HMI or the vehicle control system.

It is noted that similar docking options and support can be provided to the driver along the route between the docking station and the exit gate of the warehouse facility, e.g., once loading/unloading operations are performed and the truck needs to leave the docking station.

Further, if driver-assisted docking was initiated as determined at step 224, then, at step 232, in response to vehicle reaching the docking station, the driver's performance is rated (e.g., based on a comparison between the navigation commands, such as recommended speed and steering angle, and actual driving data, such as vehicle speed and steering angle for each sampling interval).

Figures 3A, 3B:
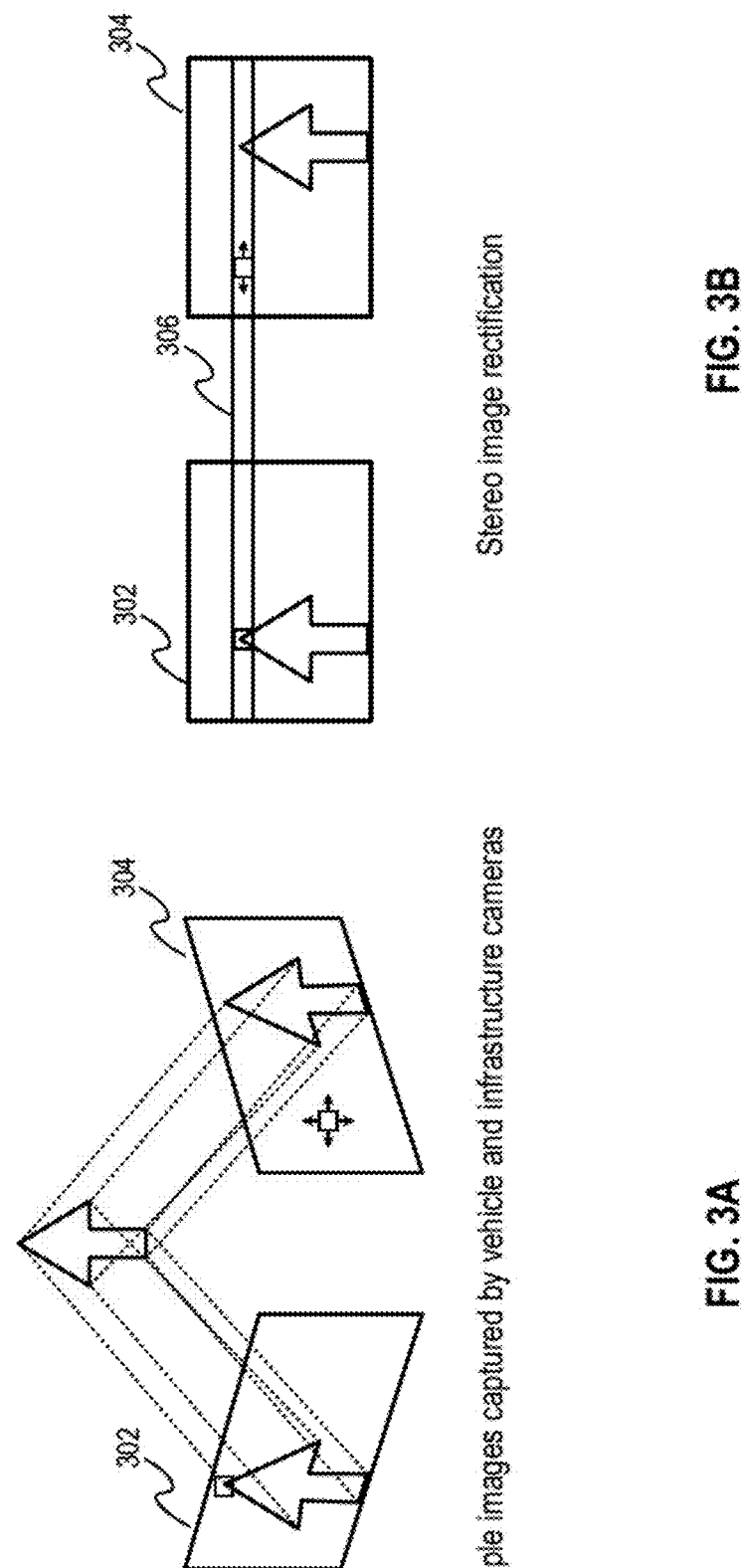
FIG. 3A depicts sample images used in the autonomous docking process in FIG. 2.
FIG. 3B depicts rectified images used in the autonomous docking process in FIG. 2.

FIG. 3A depicts sample images used in the autonomous docking process in FIG. 2. FIG. 3B depicts rectified images used in the autonomous docking process in FIG. 2. In embodiments, a stereo matching algorithm is used for disparity map calculations, employing paired images from both a vehicle camera and an infrastructure camera, e.g., images 302 and 304, respectively. Unlike in conventional stereo camera systems that rely on synchronized right and left camera images that are captured using a standard image acquisition system, in embodiments herein, synchronization is achieved by matching image features from a vehicle camera, taken at a time t, with those from one or more infrastructure camera images captured within a time frame (t±Δt). Once synchronization has been performed for each segment of a route, a depth map is created using aligned images from the vehicle and infrastructure cameras. Further, unlike conventional stereo camera techniques, the vehicle camera and the infrastructure camera are not co-planar, i.e., they are not located on the same plane. Yet, the system is adept in determining the geometric locations of each infrastructure camera, as well as the vehicle's positioning using data from infrastructure camera detections and/or the vehicle's own location information. Calibration to reduce time delays is performed by identifying the positions of both cameras at time t, followed by coordinate transformation calculations to derive a calibration matrix.

A simplified flowchart illustrating a process for creating a disparity map using two different cameras, in accordance with an example implementation is shown in FIG. 4. To generate a disparity map using images from the vehicle and infrastructure cameras for a given road segment, the system initially captures, at step 402, asynchronous images from these cameras. At step 404, the images are time-synchronized, and, at step 406, a calibration matrix is calculated by using the cameral locations. At step 408, the calibration matrix is then used to carry out image rectification to remove distortions and reprojecting the images onto a common projection plane aligned parallel to the line connecting the two cameras. As shown in FIG. 3B, this alignment ensures that epipolar lines 306 in the left and right images, 302 and 304, respectively, coincide.

Once stereo images are captured and rectified, e.g., by a calibration unit, the rectified and fused images are passed to a stereo matching unit. The stereo matching unit, focusing on pre-defined regions of interest, performs, at step 410, a disparity estimation by using a block matching technique for each pixel at a pre-determined resolution. An image may be searched for the most suitable corresponding region for a template in located another image. The template is shifted along the epipolar line within a predefined fixed disparity range. Then, the process is repeated until disparities for all pixels in the right image are estimated.

It is noted that the disparity range and disparity resolution can be varied based on specific detection range requirements and desired accuracy levels. The choice of cameras for the disparity map calculation can be made based on the vehicle's position and driving direction with respect to the global coordinates of the warehouse operational design domain. For example, the vehicle's front camera images are fused with those of the infrastructure camera when vehicle is moving forward. Conversely, the vehicle's rearview camera is used with the infrastructure camera when vehicle is moving in reverse. For enhanced safety, both rear and front camera images can be fused with infrastructure camera images during forward and reverse truck movements, respectively, to create a surrounding disparity map, thereby enhancing safety and localization accuracy.

Finally, at step 412, the fused images are used to generate a disparity map.

Figure 5:
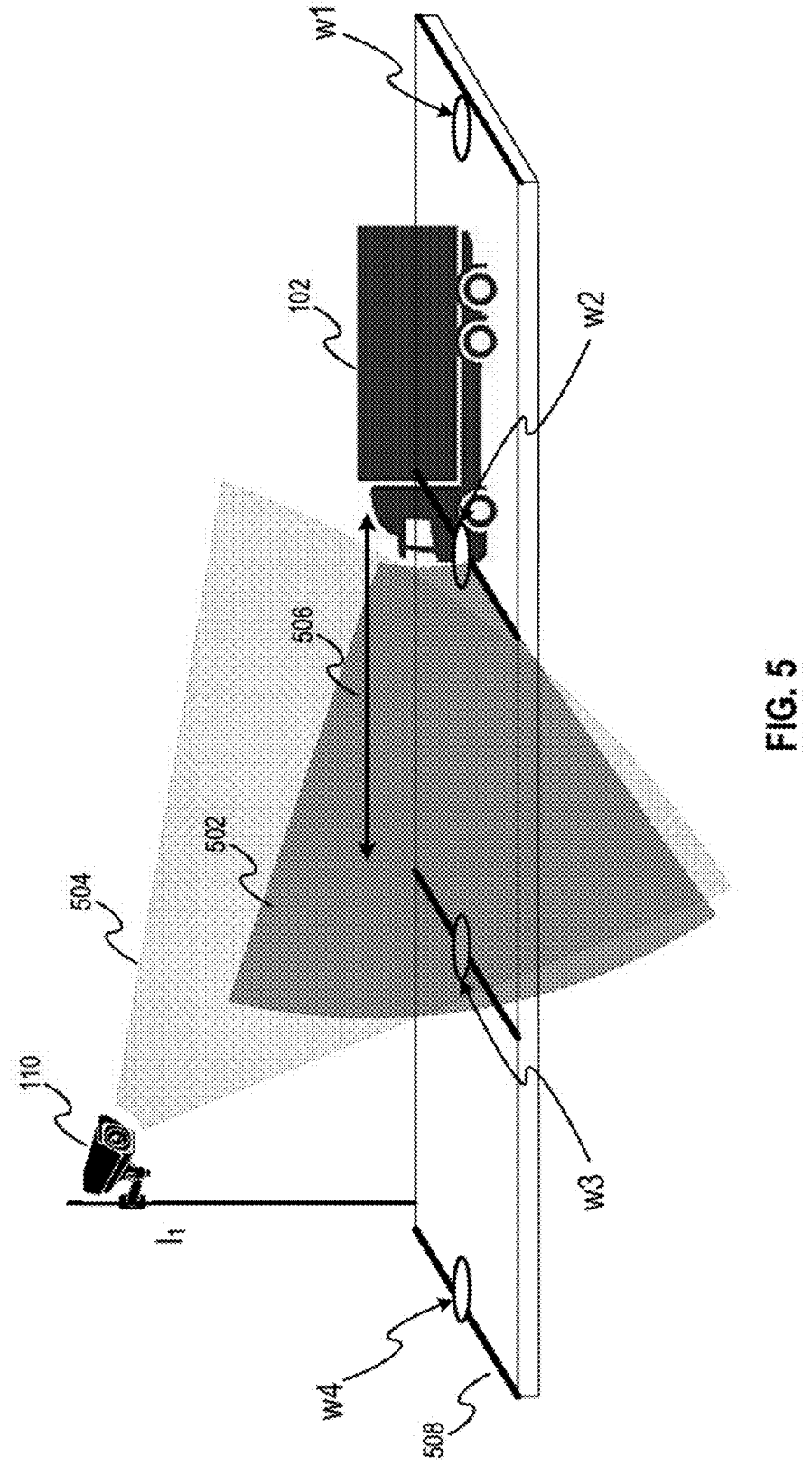
FIG. 5 depicts the use of a vehicle-mounted camera and an infrastructure-mounted camera to create a disparity map, in accordance with an example implementation.

FIG. 5 depicts the integrating of a vehicle-mounted camera and an infrastructure-mounted camera to create a disparity map, in accordance with an example implementation. As depicted in FIG. 5, the vehicle approaches road segment 506. For scenarios where vehicle 102 is moving forward, the front camera image 502 of vehicle 102 is fused with image 504 from infrastructure camera 110. Waypoints in FIG. 5, denoted as w1 through w4, are represented as circles, and road segments (e.g., 506) are separated by lines (e.g., 508). To create a disparity map for this scenario, synchronized images from vehicle 102 and infrastructure camera 110 are rectified, and the disparity map is calculated for each road segment.

Figure 6:
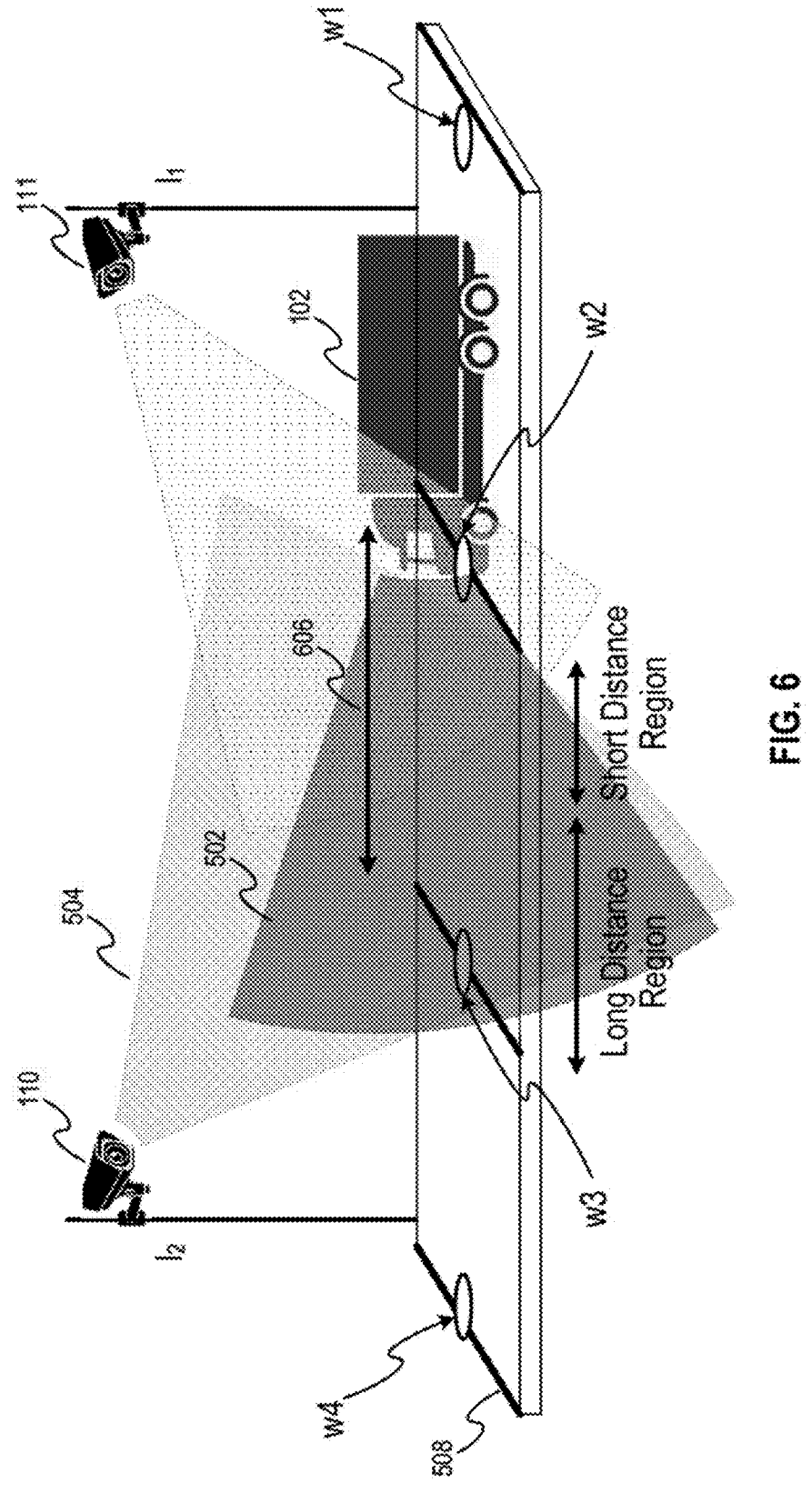
FIG. 6 depicts the use of a vehicle-mounted camera and multiple asynchronous infrastructure-mounted cameras to create a disparity map, in accordance with an example implementation.

FIG. 6 depicts the use of a vehicle-mounted camera and multiple asynchronous infrastructure-mounted cameras to create a disparity map, in accordance with an example implementation. For road segment 606 where two or more infrastructure cameras, e.g., 110 and 111, cover a region of interest, such as road segment 606, a disparity map can be created using images from 110 and 111 that are then fused with the vehicle camera image from vehicle 102.

To calculate a disparity map for range 606 in FIG. 6, the disparity map is divided into two regions, here, a "short distance region" and a "long distance region." The short distance region disparity is determined by fusing images from I1 and the vehicle's front camera. Conversely, the long distance region disparity is determined by fusing images from infrastructure camera 111 and the vehicle's front camera image 502. It is noted that the distance between infrastructure camera 111 and the camera of vehicle 102 is relatively short when compared to the distance between infrastructure camera 110 and the vehicle's camera. Hence, the short distance region disparity is calculated by using infrastructure camera 111 and the vehicle camera. When calculating the disparity for a region covered by two infrastructure cameras, the infrastructure camera closest to the vehicle camera is selected.

As previously mentioned, a vehicle's front and rear cameras are used when the motion of vehicle 102 is forward and reverse, respectively. Moreover, in scenarios with multiple cameras being available in a region, such as road segment 606, the selection of infrastructure cameras for different regions of the disparity map is determined based on the distance between the vehicle and the infrastructure camera, as well as the cameras' field of view. In cases where no infrastructure camera covers a certain road segment, a disparity map is created using mono camera information using conventional mono camera-based disparity calculation algorithms. In such cases, image synchronization and rectification processes are rendered unnecessary. A final disparity map is used for tasks such as object detection, localization, road feature estimation, etc., related to autonomous control of the vehicle.

It is noted that autonomous docking systems and methods herein are compatible with both cloud-based and local processing units. This flexibility allows their implementation to be managed either by the warehouse facility itself or, e.g., third-party service providers. In the latter case, interconnectedness between system, warehouse facility, and trucks ensures integration and coordination to facilitate efficient and seamless docking operations.

FIG. 7 is a flowchart illustrating a disparity map generation process using images from selected asynchronous cameras and vehicle-mounted cameras, in accordance with an example implementation. Selection process 700 starts at step 702, when a vehicle motion direction is determined to select an appropriate vehicle camera, e.g., front-view or rear-view camera.

At step 704, a number of infrastructure cameras is identified for a defined disparity map region.

At step 706, if only one infrastructure camera is available, that infrastructure camera is used to capture images. Otherwise, if multiple cameras are available, at step 708, the region is divided into sub-regions to capture images, and one camera is assigned to each sub-region.

At step 710, images are captured from the vehicle camera.

At step 712, the images from the infrastructure camera(s) and the vehicle camera are synchronized and rectified to compute a disparity map for the region.

Finally, at 714, the disparity map is used to perform obstacle detection with distance estimation, and localization.

Figure 8:
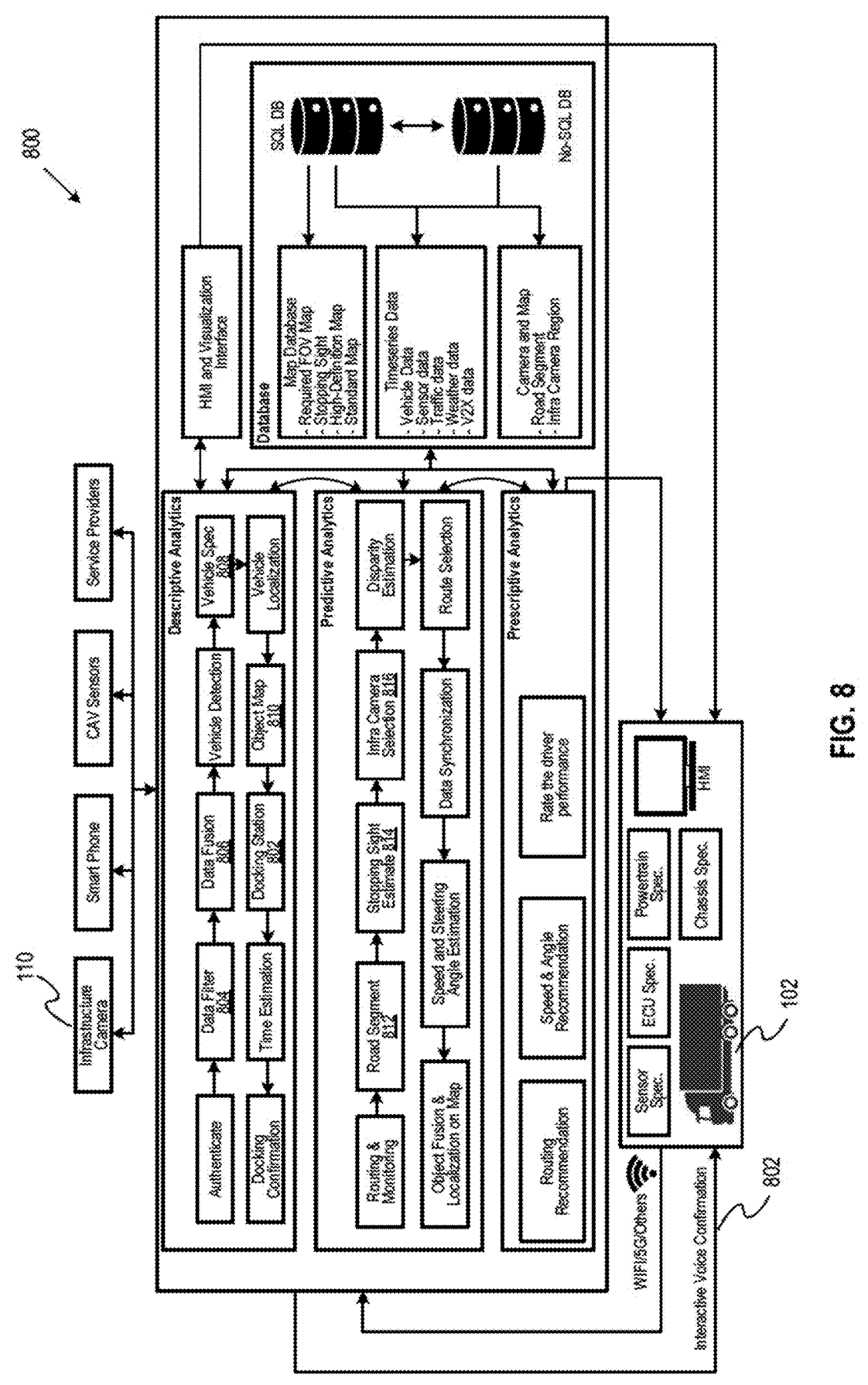
FIG. 8 depicts an exemplary data processing architecture for an autonomous docking system, in accordance with an example implementation.

FIG. 8 depicts an exemplary data management platform and data processing architecture for an autonomous docking system, in accordance with an example implementation. As previously mentioned, autonomous docking system 800 identifies truck 102 arriving at the entrance gate of the warehouse facility using infrastructure cameras (e.g., 102). In operation, truck 102 may send notification of its arrival, e.g., to a facility manager to obtain permission for docking. Data management platform 800 can receive encrypted messages from drivers and authenticate them. Encrypted vehicle information can be pre-processed in descriptive analytics modules. For example, an authentication module in data management platform 800 decrypts the messages and verifies the identity of the vehicle 102 and driver by using cryptographic hash algorithms such as MD5, SHA-1, SHA256, etc. The data authentication module ensures data validity and data integrity.

The autonomous docking system acquires infrastructure camera data to detect and localize trucks at the entrance gate. The data from vehicle 102 and infrastructure camera 110 is fused for improved accuracy for vehicle detection and localization, e.g., using respective vehicle detection and vehicle localization modules. Once the system 800 determines the vehicle's location, it determines the availability of docking station and estimates the docking time. The estimated docking time is communicated to the driver via an in-vehicle HMI, cell phone, etc. System 800 further sends interactive voice requests 802 to the driver to confirm docking intentions with the driver. Voice assistant is part of the User Interface (UI) includes three submodules: Speech-2-Text (STT), conversation bot, and Text-2-Speech. Based on the driver's response, the system determines the subsequent steps. FIG. 9A-FIG. 9C illustrate an exemplary HMI display that shows estimated docking time and driver confirmation options. Although not shown in FIG. 8, additional data analytics modules may also be used for descriptive analytics layer tasks such as data decryption, data parsing, etc.

Returning to FIG. 8, a data decryption module decrypts messages sent from vehicle 102 such that data is executable for subsequent analytic activities. A data parsing module in the descriptive layer parses incoming messages from the vehicle and converts them into a predetermined data format, e.g. JSON format. The process of detecting and correcting any corrupt messages sent from the vehicle is performed in a data cleaning module. Data filtering module 804 and data fusion module 804 are used to preprocess the data transmitted from the vehicle and to update the database accordingly. Vehicle specification module 808 processes incoming data from the vehicle to determine vehicle specifications.

Once the driver confirms a docking operation, system 800 generates an object map comprising a number of objects, obstacles, and road features in the operational area of the warehouse facility. Object map module 810 can update the obstacles and feature maps for each sampling interval or based on system administrator preferences. Then, system 800 estimates potential routes for vehicle 102 from the entrance gate to docking station 802 using the routing and monitoring module. Road segment module 812 and stopping sight distance module are used to estimate the road segment and stopping sight distance of road segments, respectively. Infrastructure camera selection module 816 selects the camera for each road segment as mentioned with reference to FIG. 5 though FIG. 7 above.

The quality of the disparity map bears on the accuracy of obstacle detection, distance measurement, and localization along the truck's route to the docking station. The quality disparity map for each road segment using selected asynchronous cameras is estimated in the disparity estimation module. Several factors such as the percentage of area coverage of stopping sight distance for road segment and the reliability of disparity in the available disparity region, etc., are used to evaluate disparity map quality. It is noted that sample images, considering vehicle and infrastructure cameras specification, are used to estimate the disparity for each road segment. An optimal route for the truck from the entrance gate to the docking station is determined based on the estimated quality of the disparity map of road segments. The route selection module selects the route that provides the highest quality of disparity map information while vehicle traversing on the route.

Any number of databases alluded to in FIG. 8 may be used, e.g., in the form of tables, to achieve the objectives of the present disclosure. For example, a map database (Table 1 below) may aid in navigation and planning tasks by providing information that supports one or more phases of a docking process.

which can be used to monitor and optimize docking maneuvers. Sensor data collected from vehicle sensors and cameras provides real-time feedback on the surrounding environment. Traffic data may include information about the current traffic conditions in and around a docking facility, which may affect route and timing selections. Data relates to current weather conditions, such as visibility and road surface conditions that may affect the docking process.

Vehicle-to-everything (V2X) data includes information communicated between a vehicle and external sources, such as infrastructure or other nearby or approaching vehicles to create situational awareness for intelligent decision-making.

TABLE 2

| | | | | | |
|---|---|---|---|---|---|
| | | Time Series Data | | | |
| Time series ID | Vehicle Data | Sensor Data | Traffic Data | Weather Data | V2X Data |
| T01 | speed, direction | camera feeds, LiDAR images | vehicle density, speed patterns | temperature, precipitation | traffic sign, emergency vehicle alert |
| T02 | size, fuel level | radar data, ultrasonic data | lane usage, congestion points | visibility | roadwork sign, safety message |

TABLE 1

| | | | | |
|---|---|---|---|---|
| | | | Map Database | |
| ID | Field of View (FOV) Map | Stopping Sight Distance | High Definition (HD) Map | Standard Map |
| M01 | 120° for main roads | 100 m | lane markings; curbs; traffic signs | basic layout of docking facility |
| M02 | 90° for loading areas | 30 m | loading bay dimensions; clearance heights | docking bay numbers and access points |
| M03 | 360° for maneuvering areas | 50 m | obstacle & pedestrian zones highlighted | general area for truck maneuvering |

In detail, an FOV map may comprise a minimum FOV that sensors, including cameras, should have to cover a corresponding area to ensure safe operation during autonomous navigation to a specific docking location. The stopping sight distance column in Table 1 indicates a minimum safety distance within which a vehicle can come to a complete stop, considering factors such as vehicle speed, road conditions, visibility conditions, and the like. An HD map may provide detailed, high-resolution data including road characteristics, specific landmarks, and other features relevant to maneuvering and docking a vehicle. A standard map may provide a general overview of the layout, including docking bays and entry gates, not necessarily including details and data quality of high-resolution HD maps.

Table 2 may be used to aid operational decision-making, e.g., by providing data streams associated with dynamic conditions that affect vehicle movement and safety. Vehicle data may include information about a vehicle's current state, including physical properties such as driving properties, Table 3 aids in ensuring that an autonomous docking system can accurately correlate visual data with geographic location within a given facility to enable accurate navigation and docking actions, e.g., based on real-time information. Road segment descriptions in Table 3 indicate specific portions of a docking facility's internal roads for which cameras, having unique camera IDs and technical specifications, provide visual data. Infrastructure camera regions identify road segments within the facility, i.e., regions that are covered by corresponding infrastructure cameras used in autonomous vehicle navigation.

TABLE 3

| | | | |
|---|---|---|---|
| | Camera and Map Database | | |
| Segment ID | Road Segment Description | Infrastructure Camera Region | Camera ID |
| S01 | entrance date to central area | north entrance | C03 |
| S02 | central area to docking bay 4 | central loading area | C08 |
| S03 | docking bay 4 to exit gate | south exit | C09 |

It is understood that additional or other databases or tables may be used to integrate digital and physical information within a docking environment such as to enhance the efficiency, safety, and reliability of autonomous docking systems in accordance with the present disclosure. For example, certain tables may include, for each camera, FOV, camera type, resolution, memory, connectivity, and other information, e.g., night vision capabilities, weatherproofing features, etc.

FIG. 9 A-FIG. 9 B depict examples of messages sent by an autonomous docking system to a driver for display on an HMI, in accordance with an example implementation. The HMI and visualization interface in the vehicle are used to display the recommendations to the driver. Once the autonomous docking system determines a vehicle's location and identifies a suitable docking station it estimates the docking time and communicates it to the driver via display as shown in FIG. 9A and prompts for a selection of a docking option, as depicted in FIG. 9B. Once a docking is initiated for a waiting truck, e.g., by a driver indicating a selection of a docking option on the display in FIG. 9B, the docking system communicates routing information to the driver, as shown in FIG. 9C.

In detail, the docking system utilizes the data synchronization module (shown in FIG. 8) to align the vehicle and infrastructure camera data for disparity map creation. For each sampling interval, the system calculates speed and steering angle requirements for the vehicle, managed by speed and steering angle estimation module. For object recognition, localization, and vehicle control as well as to display obstacles around the vehicle in real-time on HMI, the system performs calculations in the object fusion and localization on map modules. While the truck navigates the route recommendations are transmitted to the driver's HMI, as shown in FIG. 9C. Notifications that the autonomous docking system communicates to the driver include messages when a rearward motion of the truck is automatically activated, or when a gear shift is needed to activate rearward motion of the truck such that a trailer can be moved towards the docking station. Finally, once the truck reaches the docking station, the system notifies the driver and is offered similar driving support options from the docking station to the exit gate after loading and unloading tasks are completed.

Further, if the driver-assisted docking option was chosen, the system monitors, for each road segment, parameters such as actual speed, steering angle of the truck, etc. In addition, the system may observe and identify specific scenarios, such as making a turn or braking at the docking, where driver's driving errors are more pronounced. At the end of an operation, the parameters are then compared with the system-recommended values, using any known statistical methods, such as average deviation, e.g., to assess scenarios of poor performance during docking operations. This information can be used to evaluate overall driving performance, e.g., to create individual driving performance ratings. Driving performance can be monitored over time to assess progress and update records accordingly. In addition, the data may be further processed, to make driver-specific driving training recommendations.

Figure 10:
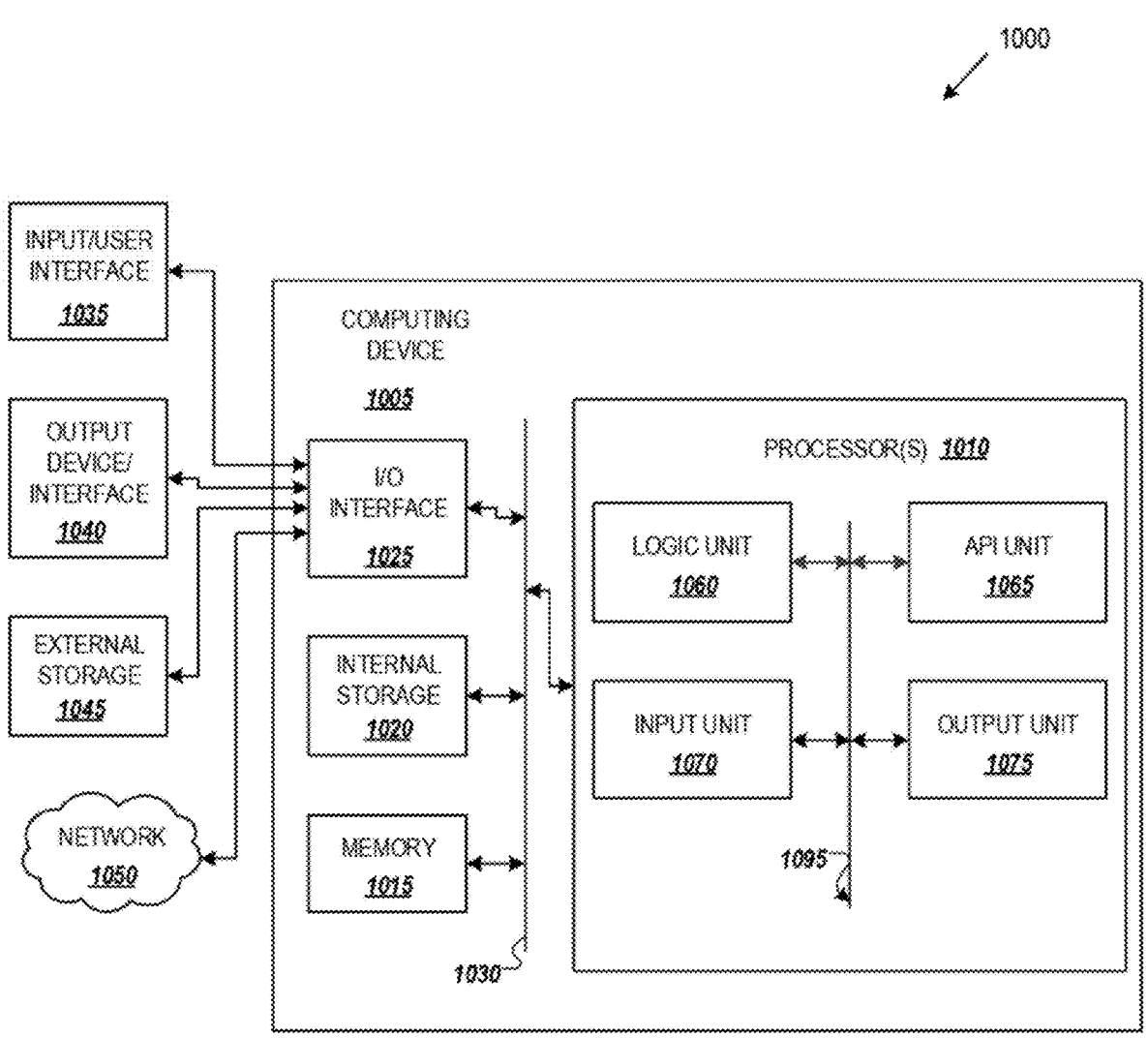
FIG. 10 illustrates an example computing environment with an example computer device suitable for use in some example implementations.

FIG. 10 illustrates an example computing environment with an example computer device suitable for use in some example implementations, such as the autonomous docking system illustrated in FIG. 8 to serve as the platform to facilitate functionality for the docking system.

Computer device 1005 in computing environment 1000 can include one or more processing units, cores, or processors 1010, memory 1015 (e.g., RAM, ROM, and/or the like), internal storage 1020 (e.g., magnetic, optical, solid-state storage, and/or organic), and/or I/O interface 1025, any of which can be coupled on a communication mechanism or bus 1030 for communicating information or embedded in the computer device 1005. I/O interface 1025 is also configured to receive images from cameras or provide images to projectors or displays, depending on the desired implementation.

Computer device 1005 can be communicatively coupled to input/user interface 1035 and output device/interface 1040. Either one or both of input/user interface 1035 and output device/interface 1040 can be a wired or wireless interface and can be detachable. Input/user interface 1035 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 1040 may include a display, television, monitor, printer, speaker, braille, or the like. In some example implementations, input/user interface 1035 and output device/interface 1040 can be embedded with or physically coupled to the computer device 1005. In other example implementations, other computer devices may function as or provide the functions of input/user interface 1035 and output device/interface 1040 for a computer device 1005.

Examples of computer device 1005 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 1005 can be communicatively coupled (e.g., via I/O interface 1025) to external storage 1045 and network 1050 for communicating with any number of networked components, devices, and systems, including one or more computer devices of the same or different configuration. Computer device 1005 or any connected computer device can be functioning as, providing services of, or referred to as a server, client, thin server, general machine, special-purpose machine, or another label.

I/O interface 1025 can include wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 1000. Network 1050 can be any network or combination of networks (e.g., the Internet, local area network, wide area network, a telephonic network, a cellular network, a satellite network, and the like).

Computer device 1005 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid-state media (e.g., RAM, ROM, flash memory, solid-state storage), and other non-volatile storage or memory.

Computer device 1005 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 1010 can execute under any operating system (OS) (not shown), in a native or virtual environment. One or more applications can be deployed that include logic unit 1060, application programming interface (API) unit 1065, input unit 1070, output unit 1075, and inter-unit communication mechanism 1095 for the different units to communicate with each other, with the OS, and with other applications (not shown). The described units and elements can be varied in design, function, configuration, or implementation and are not limited to the descriptions provided. Processor(s) 1010 can be in the form of hardware processors such as central processing units (CPUs) or in a combination of hardware and software units.

In some example implementations, when information or an execution instruction is received by API unit 1065, it may be communicated to one or more other units (e.g., logic unit 1060, input unit 1070, output unit 1075). In some instances, logic unit 1060 may be configured to control the information flow among the units and direct the services provided by API unit 1065, input unit 1070, output unit 1075, in some example implementations described above. For example, the flow of one or more processes or implementations may be controlled by logic unit 1060 alone or in conjunction with API unit 1065. Input unit 1070 may be configured to obtain input for the calculations described in the example implementations, and the output unit 1075 may be configured to provide output based on the calculations described in example implementations.

Processor(s) 1010 can be configured to execute a method or computer instructions which can involve, in response to receiving asynchronous images from a vehicle-mounted camera and a plurality of infrastructure cameras, performing an object mapping to determine candidate routes leading to a docking station; in response to dividing each candidate route into route segments, estimating for each route segment a disparity map quality score to select a navigation route among the candidate routes; using information from at least some of the plurality of infrastructure cameras and the vehicle-mounted camera to generate a disparity map to perform at least one of object detection, distance measurement, or localization along the navigation route; and using the disparity map to communicate navigation commands to at least one of a HMI or a vehicle control system, as described, for example, with respect to FIG. 2-FIG. 8.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer-readable medium, such as a computer-readable storage medium or a computer-readable signal medium. A computer-readable storage medium may involve tangible mediums such as, but not limited to optical disks, magnetic disks, read-only memories, random access memories, solid-state devices and drives, or any other types of tangible or non-transitory media suitable for storing electronic information. A computer-readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the techniques of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general-purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the techniques of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for autonomous docking of a vehicle, the method comprising:

in response to receiving, at a docking system from a plurality of infrastructure cameras that are mounted at different locations and orientations at a docking facility, image data indicative of a presence of a vehicle, obtaining vehicle-related information from a vehicle, which comprises a vehicle-mounted camera, to identify an available docking station;

extracting features from at least some of the image data to perform an object mapping to identify one or more objects in proximity to the docking facility;

using the object mapping to determine candidate routes leading to the available docking station;

for each of the candidate routes, iteratively performing steps comprising:

dividing the candidate route into a plurality of waypoints;

determining route segments that each is defined by a distance between two waypoints among the plurality of waypoints;

for each of one or more route segments among the route segments, performing steps comprising:

using location information regarding at least some of the plurality of infrastructure cameras and the vehicle-mounted camera to determine an overlapping region between the vehicle-mounted camera and one infrastructure camera among the plurality of infrastructure cameras to identify a selected infrastructure camera;

combining asynchronous images from the selected infrastructure camera and from the vehicle-mounted camera, to create a three-dimensional (3-D) depth map; and using the 3-D depth maps to estimate a disparity map quality score; and using the disparity map quality scores for the route segments to estimate a disparity map quality score for the candidate route;

using the disparity map quality scores for the candidate routes to select a navigation route; and using information from at least some of the plurality of infrastructure cameras and the vehicle-mounted camera to generate a disparity map to perform object detection, distance measurement, and localization along the navigation route; and using the disparity map to communicate navigation commands to at least one of a human machine interface (HMI) or a vehicle control system.

2. The method of claim 1, further comprising communicating the estimate, via a human machine interface, to a driver.

3. The method of claim 2, wherein the HMI comprises a smartphone application.

4. The method of claim 2, further comprising establishing a secure communication between the docking system and at least one of the HMI or the vehicle control system.

5. The method of claim 4, further comprising in response to selecting the route and receiving, via an HMI application, a response to a query, initiating a docking process that comprises steps comprising at least one of:

receiving from the vehicle control system at least one of vehicle specifications, sensor specifications, or vehicle electronic control unit (ECU) specifications;

communicating a driving command to a vehicle control system, or communicating driving information that comprises the selected route to the HMI.

6. The method of claim 5, wherein at least one or more of the object mapping, the 3D depth map, the vehicle-related information, the driving command, or the driving information is updated in real-time.

7. The method of claim 5, wherein the driving information comprises a driving recommendation that comprises at least one of a speed recommendation or a steering angle recommendation.

8. The method of claim 5, further comprising, in response to the docking process having been initiated, performing steps comprising at least one of:

using one or more cameras to determine a vehicle localization and performing a mapping;

for a plurality of sampling times, combining first image data obtained from the selected infrastructure camera and second image data obtained from the vehicle camera to generate a disparity map of the route;

using the disparity map to identify one or more objects along the driving route; and monitoring a driving performance.

9. The method of claim 8, further comprising in response to vehicle reaching the docking station, using the driving performance to generate a driver rating and communicating the driver rating to the docking system.

10. The method of claim 7, wherein communicating the driving information comprises communicating directions to move the vehicle along the selected route.

11. The method of claim 1, wherein using the disparity map quality scores comprises determining at least one of a maximum disparity map quality score or an average disparity map quality score for the candidate route.

12. The method of claim 1, further comprising, for at least one of the one or more route segments, dividing that route segment into a first region and a second region, and wherein the selected infrastructure camera is identified based on its proximity to the first region or the second region.

13. The method of claim 1, wherein the selected infrastructure camera is identified based on a vehicle location and a driving direction, wherein the vehicle-mounted camera is a rear-view camera when the vehicle is moving in a reverse direction.

14. The method of claim 1, wherein the selected infrastructure camera and the vehicle-mounted camera are located at different planes.

15. The method of claim 1, further comprising calculating for two route segments that each have different lengths a stopping site distance.

16. The method of claim 1, wherein identifying the available docking station comprises generating an estimate of at least one of a minimum docking time or a wait time.

17. The method of claim 1, wherein combining the asynchronous images to create the 3-D depth map:

receiving asynchronous images from the vehicle-mounted camera and the infrastructure camera;

comparing a feature of the asynchronous images that were taken with a time delay to time-synchronize the asynchronous images;

using camera locations to calculate a calibration matrix;

using the calibration matrix to perform an image rectification on the asynchronous images to obtain rectified images; and in response to determining a disparity range and a disparity resolution, using the rectified images to estimate the 3-D depth map.

18. A system for autonomous vehicle docking, the system comprising:

infrastructure cameras configured to be mounted at different locations and orientations at a docking facility;

a docking system controller coupled to the infrastructure cameras, the docking system controller configured to perform steps comprising:

in response to receiving asynchronous images from a vehicle-mounted camera and a plurality of infrastructure cameras, performing an object mapping to determine candidate routes leading to a docking station;

in response to dividing each candidate route into route segments, estimating for each route segment a disparity map quality score to select a navigation route among the candidate routes;

using information from at least some of the plurality of infrastructure cameras and the vehicle-mounted camera to generate a disparity map to perform at least one of object detection, distance measurement, or localization along the navigation route; and using the disparity map to communicate navigation commands to at least one of a human machine interface (HMI) or a vehicle control system, wherein estimating the disparity map quality scores comprises simulating overlapping regions between the vehicle-mounted camera and an infrastructure camera among the plurality of infrastructure cameras.

19. A non-transitory computer-readable medium for storing instructions for executing a process, the instructions comprising:

in response to receiving asynchronous images from a vehicle-mounted camera and a plurality of infrastructure cameras, performing an object mapping to determine candidate routes leading to a docking station;

in response to dividing each candidate route into route segments, estimating for each route segment a disparity map quality score to select a navigation route among the candidate routes;

using information from at least some of the plurality of infrastructure cameras and the vehicle-mounted camera to generate a disparity map to perform at least one of object detection, distance measurement, or localization along the navigation route; and using the disparity map to communicate navigation commands to at least one of a human machine interface (HMI) or a vehicle control system, wherein estimating the disparity map quality scores comprises simulating overlapping regions between the vehicle-mounted camera and an infrastructure camera among the plurality of infrastructure cameras.

* * * * *